(12) United States Patent
Suzuki et al.

(10) Patent No.: US 11,389,969 B2
(45) Date of Patent: Jul. 19, 2022

(54) AUTOMATIC MACHINE AND CONTROL DEVICE

(71) Applicant: FANUC CORPORATION, Yamanashi (JP)

(72) Inventors: Hajime Suzuki, Yamanashi (JP); Nobuaki Yamaoka, Yamanashi (JP); Kouichirou Hayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 483 days.

(21) Appl. No.: 16/446,633

(22) Filed: Jun. 20, 2019

(65) Prior Publication Data
US 2020/0009742 A1 Jan. 9, 2020

(30) Foreign Application Priority Data
Jul. 6, 2018 (JP) .............................. JP2018-128997

(51) Int. Cl.
| | |
|---|---|
| B25J 13/08 | (2006.01) |
| B25J 18/04 | (2006.01) |
| B25J 5/00 | (2006.01) |
| B25J 9/16 | (2006.01) |

(52) U.S. Cl.
CPC ............. *B25J 13/089* (2013.01); *B25J 5/005* (2013.01); *B25J 9/1651* (2013.01); *B25J 18/04* (2013.01); *B25J 9/1679* (2013.01)

(58) Field of Classification Search
CPC ........ B25J 13/089; B25J 5/005; B25J 9/1651; B25J 18/04; B25J 9/1694; B25J 9/1602; B25J 9/1661; B25J 13/088; B25J 17/0258; B25J 18/00
See application file for complete search history.

(56) References Cited

U.S. PATENT DOCUMENTS

| | | | |
|---|---|---|---|
| 2017/0203318 A1* | 7/2017 | Vahanen | ................ B05B 15/70 |
| 2017/0326737 A1* | 11/2017 | Martin | ..................... B25J 9/045 |
| 2020/0238534 A1* | 7/2020 | Goldberg | ............... B25J 9/0093 |

FOREIGN PATENT DOCUMENTS

| | | |
|---|---|---|
| DE | 102012104194 B4 | 10/2015 |
| EP | 3266571 B1 | 7/2019 |
| EP | 3169442 B1 | 9/2019 |
| JP | S56175176 U | 12/1981 |
| JP | S60605 U | 1/1985 |

(Continued)

*Primary Examiner* — Robert T Nguyen
*Assistant Examiner* — Dylan M Katz
(74) *Attorney, Agent, or Firm* — Hauptman Ham, LLP (57) ABSTRACT

The automatic machine includes a movable member driven by a motor, a tool that is attached to the movable member and includes a movable mechanism that operates independently of the movable member, a sensor that is attached to the movable mechanism and measures a location of the movable mechanism, and a processor configured to detect, based on a location of the movable mechanism measured by the sensor when the motor is controlled in accordance with a command to move the tool to a target location and on an amount of movement of the movable mechanism from a reference point, detects a first location in a case in which the movable mechanism is virtually fixed to the reference point, and calculate a correction amount for a control amount of the motor in such a way as to decrease a difference between the target location and the first location.

6 Claims, 4 Drawing Sheets

(56) References Cited

FOREIGN PATENT DOCUMENTS

| | | |
|---|---|---|
| JP | H10111701 A | 4/1998 |
| JP | 200566619 A | 3/2005 |
| JP | 2006-172149 A | 6/2006 |
| JP | 2011-167817 A | 9/2011 |
| JP | 2012240142 A | 12/2012 |
| JP | 2017-74647 A | 4/2017 |

* cited by examiner

AUTOMATIC MACHINE AND CONTROL DEVICE

RELATED APPLICATIONS

The present application claims priority of Japanese Application Number 2018-128997, filed Jul. 6, 2018, the disclosure of which is hereby incorporated by reference herein in its entirety.

FIELD

The present invention relates to, for example, an automatic machine that includes a movable member and a control device for such an automatic machine.

BACKGROUND

With respect to an automatic machine, such as a robot or a machine tool, that includes a movable member, such as an arm, that is driven by a servomotor, techniques have been proposed for improving operation accuracy of such a movable member (see, e.g., Japanese Unexamined Patent Publication (Kokai) No. 2011-167817 and Japanese Unexamined Patent Publication (Kokai) No. 2017-74647).

According to these techniques, a sensor is attached to the movable member. The sensor measures the location of the movable member when the movable member performs a certain operation, and the control amount (e.g., amount of electric current and the like supplied to the servomotor) for controlling the servomotor driving the movable member is corrected in such a way as to bring the measured location closer to the target location.

SUMMARY

Some automatic machines may include a movable member with a tool attached thereto, wherein the tool includes a movable mechanism that operates independently of the operation of the automatic machine itself. In such a case, even when the above-mentioned techniques are applied to bring the location of the tool attached to the movable member closer to the target location, it is not possible to correct the control amount for controlling the servomotor appropriately due to the operation of the tool itself, which may result in a failure to improve the accuracy of location in the operations of the movable member and the tool.

In one aspect, an objective is to provide an automatic machine that, even when a tool that operates independently of a movable member is attached to the movable member, can improve the accuracy of location of the movable member and the tool during the operations of the movable member and the tool.

According to an embodiment, an automatic machine is provided. The automatic machine includes: a movable member that is movable by being driven by a motor; a tool that is attached to the movable member and includes a movable mechanism that operates independently of the movable member; a sensor that is attached to the movable mechanism and measures a location of the movable mechanism; and a processor configured to detect, based on a location of the movable mechanism measured by the sensor when the motor is controlled in accordance with a command to move the tool to a target location and on an amount of movement of the movable mechanism from a reference point within a moving range of the movable mechanism with the tool as reference, a first location in a case in which the movable mechanism is virtually fixed to the reference point; and calculate a correction amount for a control amount of the motor in such a way as to decrease a difference between the target location and the first location.

According to another embodiment, there is provided a control device of an automatic machine that includes a movable member that is movable by being driven by a motor and a tool that is attached to the movable member and includes a movable mechanism which operates independently of the movable member. The control device includes: a processor configured to detect, based on a location of the movable mechanism measured by a sensor attached to the movable member when the motor is controlled in accordance with a command to move the tool to a target location and on an amount of movement of the movable mechanism from a reference point within a moving range of the movable mechanism with the tool as reference, a first location in a case in which the movable mechanism is virtually fixed to the reference point; and calculate a correction amount for a control amount of the motor in such a way as to decrease a difference between the target location and the first location.

According to one aspect, even when a tool that operates independently of a movable member is attached to the movable member, it is possible to improve the accuracy of location of the movable member and the tool during the operations of the movable member and the tool.

DESCRIPTION OF EMBODIMENTS

An automatic machine according to an embodiment of the present invention will be described below with reference to the drawings. This automatic machine includes a movable member such as an arm, and a tool is attached to the distal end of the movable member, wherein the tool includes a movable mechanism that operates independently of the movable member. A sensor is attached to the movable mechanism of the tool for acquiring a location. When the movable member and the tool are moved to a target location, this automatic machine measures the actual location of the movable mechanism of the tool by using the sensor attached to the movable mechanism. The automatic machine then controls, by learning, the control amount for controlling the servomotor that drives the movable member in such a way as to decrease the difference between the target location and the location of the tool in a case in which the movable mechanism is virtually fixed to a reference point, which is calculated by subtracting the amount of movement from the reference point of the movable mechanism from the actual location of the movable mechanism of the tool.

Note that the matter that the movable mechanism of the tool operates independently of the movable member means that the movable mechanism operates in a way unrelated to the operation of the movable member (e.g., a movement of the movable member to a target location or an operation of the movable member for taking a target position) controlled by the control device of the automatic machine.

Figure 1:
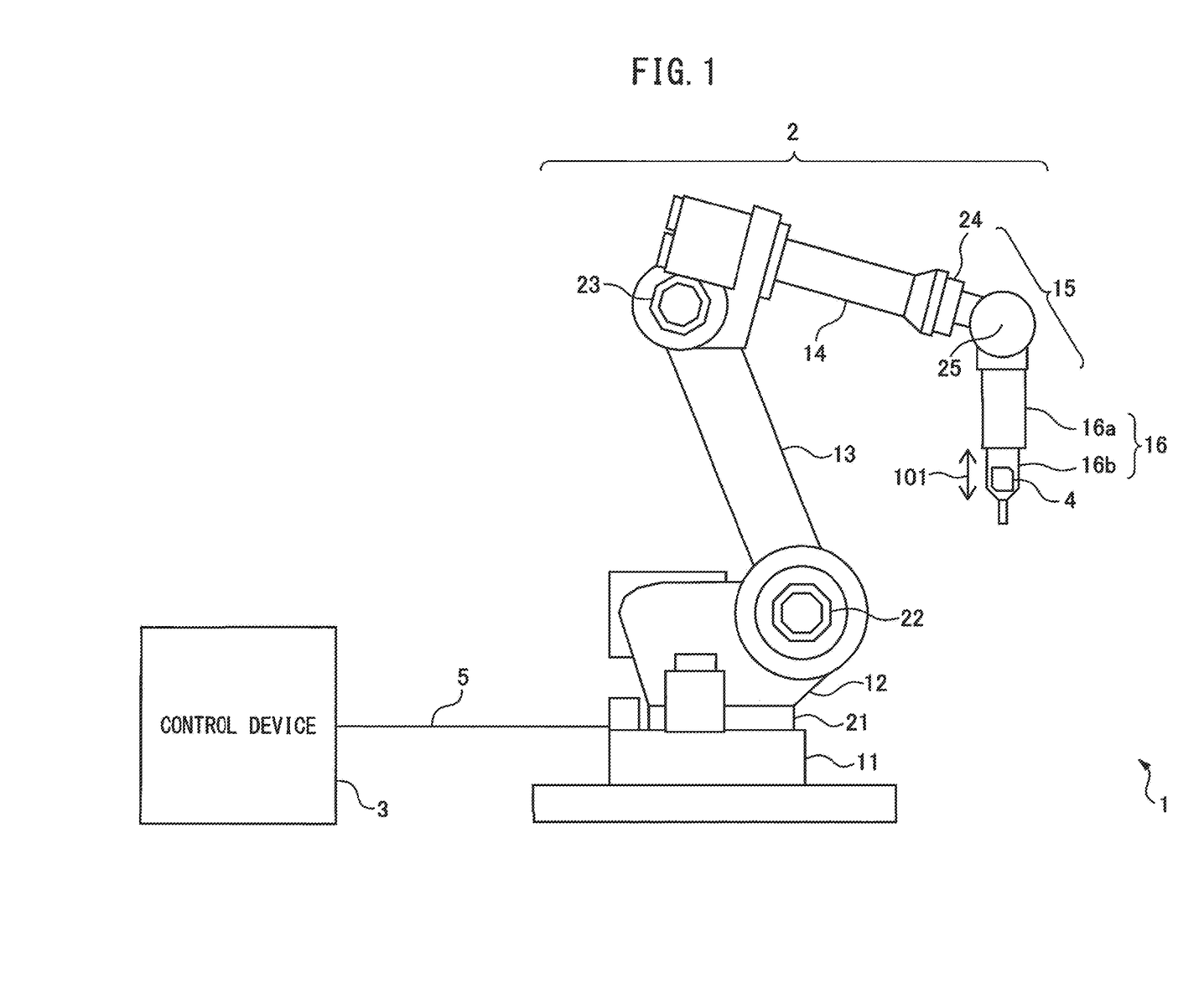
FIG. 1 is a schematic configuration diagram of a robot system according to an embodiment.

FIG. 1 is a schematic configuration diagram of a robot system 1 according to an embodiment. The robot system 1 includes a robot 2, a control device 3 that controls the robot 2, and an acceleration sensor 4 for detecting the location of a movable mechanism of a tool 16, which is attached to the robot 2. The robot system 1 is an example of an automatic machine.

The robot 2 includes a pedestal 11, a rotary stage 12, a first arm 33, a second arm 14, a wrist 15, and the tool 16. The rotary stage 12, the first arm 13, the second arm 14, and the wrist 15 are each an example of a movable member. The rotary stage 12, the first arm 13, the second arm 14, and the wrist 15 are respectively supported by the axes provided for the joints to which they are attached, and operated by servomotors driving the axes. The tool 16 is an example of a tool that includes a movable mechanism that operates independently of a movable member of the automatic machine.

The pedestal 11 is a member serving as a base when the robot 2 is installed on the floor. The rotary stage 12 is rotatably attached on the top surface of the pedestal 11 by means of a joint 21 about an axis (not illustrated) provided perpendicular to the surface of the pedestal 11.

The first arm 13 is attached, at an end thereof, to the rotary stage 12 by means of a joint 22 provided on the rotary stage 12. In the present embodiment, as illustrated in FIG. 1, the first arm 13 is rotatable by means of the joint 22 about an axis (not illustrated) provided parallel to the surface of the pedestal 11 on which the rotary stage 12 is attached.

The second arm 14 is, at its one end side, attached to the first arm 13 by means of a joint 23 provided at the other end of the first arm 13, opposite to the joint 22. In the present embodiment, as illustrated in FIG. 1, the second arm 14 is rotatable by means of the joint 23 about an axis (not illustrated) provided parallel to the surface of the pedestal 11 on which the rotary stage 12 is attached.

The wrist 15 is attached to the distal end of the second arm 14, opposite to the joint 23 by means of a joint 24. The wrist 15 includes a joint 25 and is bendable by means of the joint 25 about an axis (not illustrated) provided parallel to the axis of the joint 22 and the axis of the joint 23. Further, the wrist 15 may be rotatable about an axis (not illustrated) parallel to the longitudinal direction of the second arm 14 on a plane perpendicular to the longitudinal direction of the second arm 14.

The tool 16 is attached to the distal end of the wrist 15, opposite to the joint 24. In the present embodiment, the tool 16 is used for machining a workpiece with laser. The tool 16 includes a cylindrical tool body 16a provided in such a way as to extend from the distal end of the wrist 15 and a laser head 16b attached in the tool body 16a in such a way as to be movable along the direction in which the tool body 16a extends, as indicated by the arrow 101, and outputs a laser beam for machining. The laser head 16b is an example of a movable mechanism that operates independently of the movable member of the robot 2, and moves along the direction in which the tool body 16a extends by being driven by a motor (not illustrated) placed in the tool body 16a. The location of the laser head 16b is controlled, for example, in such a way that the distance between the laser head 16b and the workpiece is kept constant on the basis of the distance to the workpiece detected by a distance sensor (not illustrated) attached to the laser head 16b. The amount of movement of the laser head 16b is detected by a sensor for detecting an amount of movement, such as an encoder attached to the motor driving the laser head 16b, and is outputted to the control device 3 via a communication line 5. Note that, when the laser head 16b is driven by a motor the rotation amount of which can be directly commanded, such as a stepping motor, the rotation amount of the motor may be outputted to the control device 3 via the communication line 5 as the amount of movement of the laser head 16b.

The acceleration sensor 4 is an example of a measuring unit that measures the location of the movable mechanism and is attached to the laser head 16b. The acceleration sensor 4 may be, for example, a 3-axis acceleration sensor. The acceleration sensor 4 measures acceleration throughout the operation of the robot 2 and outputs the measured acceleration to the control device 3 via the communication line 5.

Note that the automatic machine may be other than the robot 2 illustrated in FIG. 1 and needs only to include an axis driven by a drive unit such as a servomotor and at least one movable member supported by the axis.

Further, the tool 16 attached to the wrist 15 of the robot 2 may be other than the one described above. For example, the tool 16 may be a servo gun used for welding. In such a case, the tool 16 includes a gun body, which is an example of a movable mechanism, an attachment unit for attaching the servo gun to the wrist 15, and an equalizing mechanism provided between the gun body and the attachment unit. The equalizing mechanism drives the gun body along a certain direction to reduce the reaction force applied to the servo gun. The acceleration sensor 4 may be attached to the gun body also in this case.

The control device 3 is connected to the robot 2 via the communication line 5 and receives information indicating operation stales of the servomotors driving the axes provided for respective joints of the robot 2, acceleration from the acceleration sensor 4, amount of movement of the laser head 16b of the tool 16, and the like from the robot 2 via the communication line 5. The control device 3 controls the locations and positions of movable members of the robot 2 by controlling the servomotors on the basis of the received information and the operation of the robot 2 received from a superordinate control device (not illustrated) or set in advance.

Figure 2:
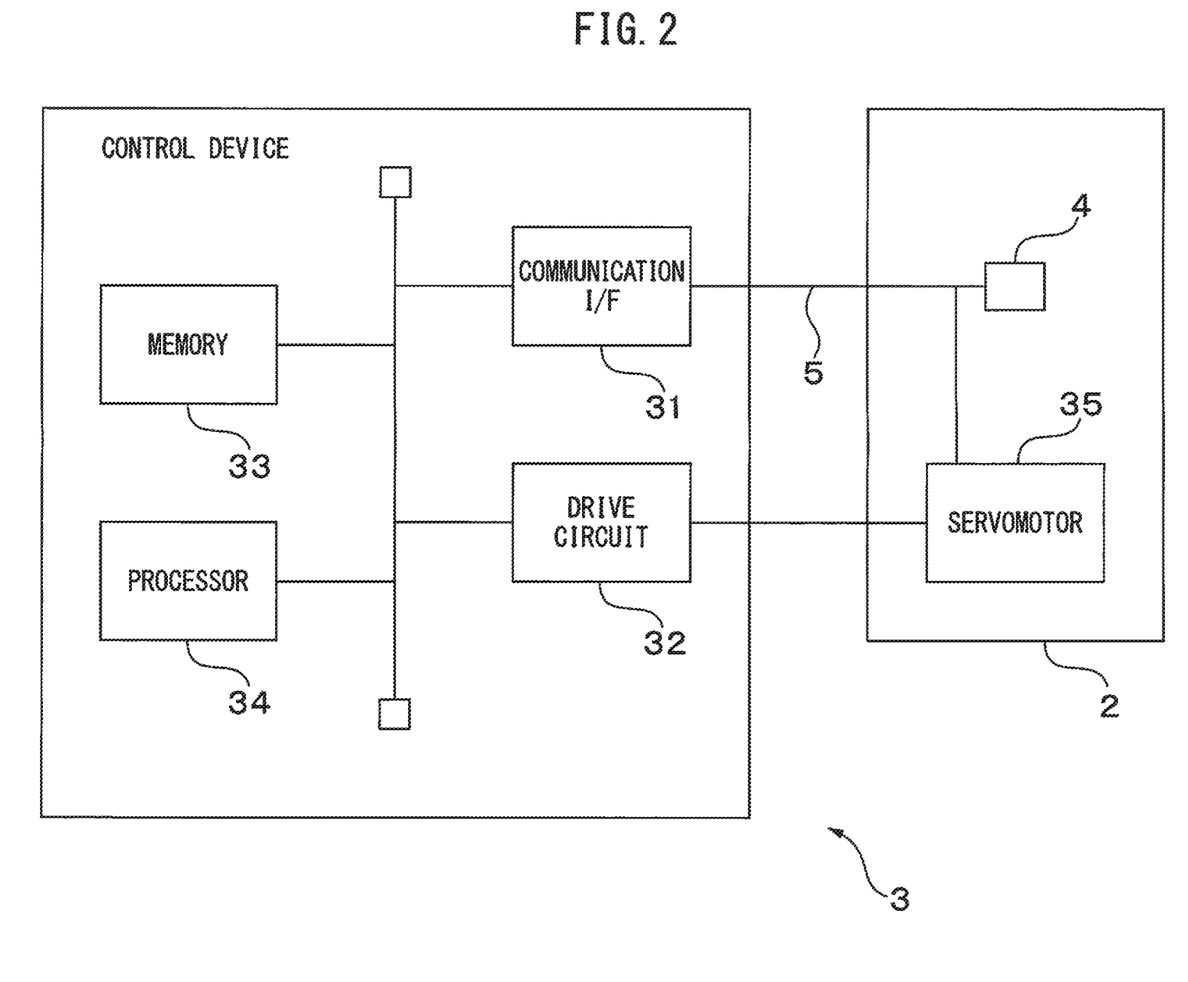
FIG. 2 is a schematic configuration diagram of a control device.

FIG. 2 is a schematic configuration diagram of a control device 3. The control device 3 includes a communication interface 31, a drive circuit 32, memory 33, and a processor 34. The control device 3 may further include a user interface (not illustrated) such as a touch panel.

The communication interface 31 includes, for example, a communication interface for connecting the control device 3 with the communication line 5, and a circuit for executing the processing for signal transmission/reception via the communication line 5. The communication interface 31, for example, receives information indicating the operation state of the servomotor 3b from the robot 2 via the communication line 5 and passes the information to the processor 34, wherein the information may be a measured value sent from an encoder for detecting the rotation amount of the servomotor 35, which is an example of a drive unit, and the like. Note that, although a single servomotor 35 is illustrated as a representative example in FIG. 2, the robot 2 may include, for each joint, a servomotor for driving the axis of the joint. Further, the communication interface 31 receives acceleration measured by the acceleration sensor 4, a measured value indicating the amount of movement of the laser head 16b, and the like from the robot 2 and passes the values to the processor 34.

The drive circuit 32 is connected with the servomotor 35 via a current-supply cable and, under the control of the processor 34, supplies the servomotor 35 with electric power in accordance with the torque, direction of rotation, or rotational speed that are required.

The memory 33 is an example of a storage unit and includes, for example, a readable and writable semiconductor memory and a read-only semiconductor memory. The memory 33 may further include a recording medium, such as a semiconductor memory card, a hard disk, or an optical recording medium, and a device that accesses the recording medium.

The memory 33 stores various computer programs for controlling the robot 2, and the like, which are executed by the processor 34 of the control device 3. Further, the memory 33 stores information for designating the operation of the robot 2 when the robot 2 is operated, for example, a location command for moving the arms and the tool 16 of the robot 2 to a certain target location, and the like. Further, the memory 33 stores various data such as information indicating the operation state of the servomotor 35, acquired from the robot 2 during the operation of the robot 2, correction amount generated during the control information learning processing or as a result of the control information learning processing.

The processor 34 is an example of a control unit and includes, for example, a central processing unit (CPU) and a peripheral circuit thereof. The processor 34 may further include a processor for arithmetic operation. The processor 34 controls the entire robot system 1. Further, the processor 34 executes control information learning processing.

Figure 3:
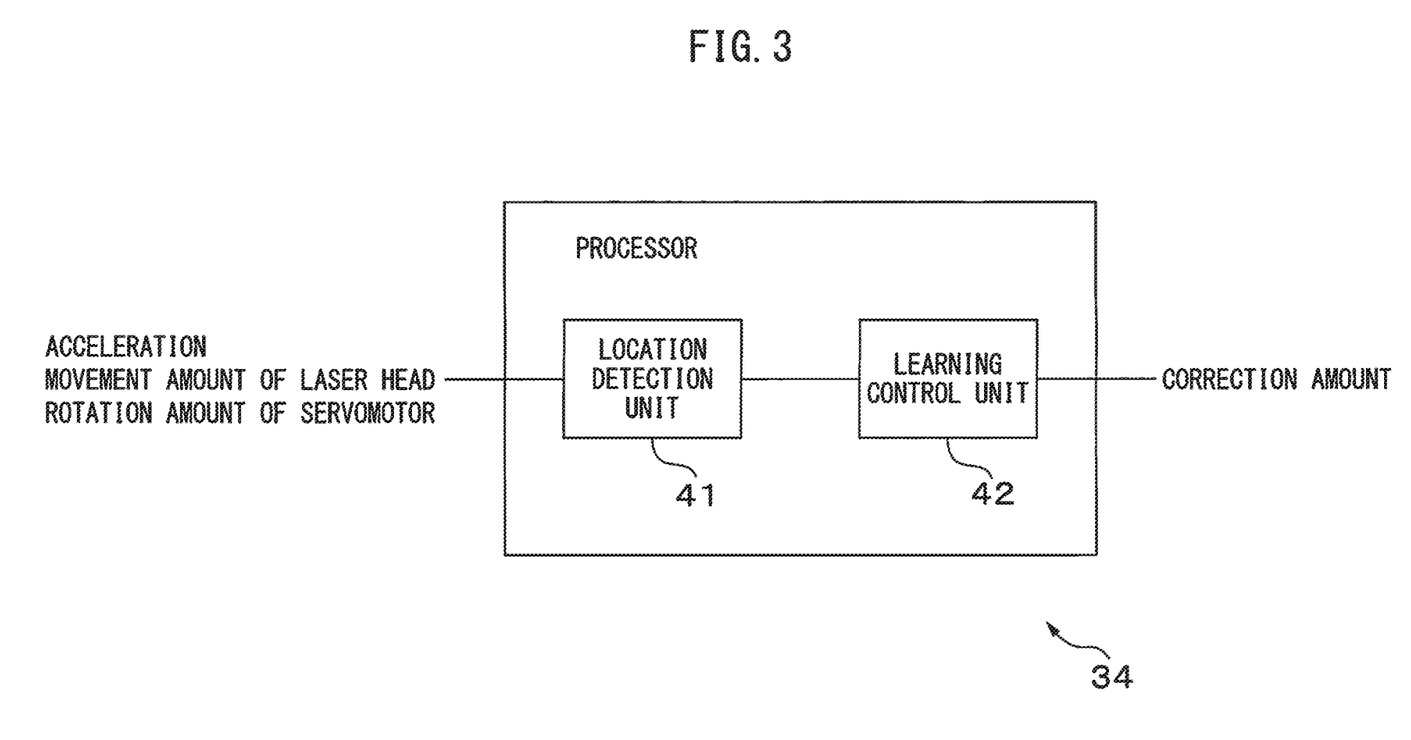
FIG. 3 is a functional block diagram of a processor included in the control device with respect to control information learning processing.

FIG. 3 is a functional block diagram of the processor 34 with respect to control information learning processing. The processor 34 includes a location detection unit 41 and a learning control unit 42. These units of the processor 34 are, for example, functional modules that are realized by a computer program executed on the processor 34. Alternatively, these units may be implemented by dedicated arithmetic circuits mounted as part of the processor 34.

The location detection unit 41 detects the location of the laser head 16b in a case in which the laser head 16b of the tool 16 is virtually fixed to the reference point when the servomotor 35 is controlled in accordance with a location command to move the tool 16 to a target location. In the present embodiment, the location detection unit 41 detects the location of the laser head 16b in a case in which the laser head 16b is virtually fixed to the reference point on the basis of acceleration acquired from the acceleration sensor 4 and a measured value indicating the amount of movement of the laser head 16b relative to the reference point of the laser head 16b.

Note that the reference point may be set at any location within the moving range of the laser head 16b with the tool 16 as reference, for example, at the end point toward the wrist 15 of the moving range of the laser head 16b. The reference point is represented in a tool coordinate system, in which the origin is set at a location on the tool 16 and one of the axes is set in a certain direction of the tool 16 (e.g., the longitudinal direction of the tool 16 or the direction in which the laser head 16b can move). Thus, the direction and amount of movement of the laser head 16b from the reference point, caused by the motor driving the laser head 16b, are represented in the tool coordinate system. The location of the reference point itself in the world coordinate system moves according to a change in position of the robot 2. The world coordinate system is a coordinate system that has the origin thereof at a point in the space in which the robot 2 is installed and that does not change even when the position of the robot 2 changes.

For example, the location detection unit 41 carries out an second order integration of the acceleration acquired by the acceleration sensor 4 during the period from the start of an operation of the robot 2 in accordance with a location command to the end of the control for moving the tool 16 to the target location designated by the location command and thereby calculates the amount of displacement from the location of the laser head 16b at the start of the operation. The location detection unit 41 then calculates the location of the laser head 16b in the world coordinate system by adding the displacement amount to the location of the laser head 16b at the start of the operation.

Further, the location detection unit 41 converts the direction of movement of the laser head 16b relative to the reference point in the tool coordinate system into a direction of movement represented in the world coordinate system. In so doing, the location detection unit 41 can calculate the rotation amounts of the joints of the robot 2 based on the actual rotation amount of the servomotor 35 (i.e., operation amount of the drive unit) during the period from the start of the operation of the robot 2 in accordance with a location command to the end of the control for moving the tool 16 to the target location designated by the location command. Therefore, the location detection unit 41 can detect the position of the robot 2 at the end of the control. The location detection unit 41 can also detect the position of the tool 16 attached to the wrist 15 from the position of the robot 2 at the end of the control. The location detection unit 41 calculates from the detected position of the tool 16 the affine matrix for the conversion from the tool coordinate system into the world coordinate system and may convert the direction of movement of the laser head 16b in the tool coordinate system into a direction of movement of the laser head 16b in the world coordinate system by using the affine matrix.

The location detection unit 41 detects the location of the laser head 16b in the world coordinate system in a case in which the laser head 16b is virtually fixed to the reference point by subtracting, from the location of the laser head 16b represented in the world coordinate system, the amount of movement of the laser head 16b from the reference point represented in the world coordinate system. The location detection unit 41 then informs the learning control unit 42 of the location of the laser head 16b in the world coordinate system in a case in which the laser head 16b is virtually fixed to the reference point.

The learning control unit 42 controls, by learning, the control amount of the servomotor 35 in such a way as to decrease the difference (referred to as location deviation hereafter for the sake of convenience) between the target location of the tool 16 designated by the location command (note that the target location is set, for example, in relation to the reference point of the laser head 16b) and the location of the laser head 16b in a case in which the laser head 16b is virtually fixed to the reference point, which is detected by the location detection unit 41.

Ideally, the target location of the tool 16 designated by the location command and the location of the laser head 16b in a case in which the laser head 16b is virtually fixed to the reference point, detected by the location detection unit 41 would match each other. However, a location discrepancy between the target location of the tool 16 designated by the location command and the actual location of the reference point of the laser head 16b occurs due to vibrations of the arms 13 and 14, the wrist 15, or the tool 16 during the operation of the robot 2, and the like, and the location deviation will not be zero. By controlling the control amount of the servomotor 35 by learning in such a way as to decrease this location deviation, the learning control unit 42 can reduce the effects of vibrations on accuracy in location and thereby improve the accuracy in location of the tool 16 located at the distal end of the robot 2 during the operation of the robot 2.

The learning control unit 42 may perform learning control according to one of various learning control techniques for decreasing location discrepancy between the location of the distal end of a robot measured by an acceleration sensor or the like attached to the distal end of the robot and the location of the distal end of a robot designated by the location command. For example, the learning control unit 42 may perform learning control according to a learning control technique disclosed in Japanese Unexamined Patent Publication (Kokai) No. 2006-172149 or Japanese Unexamined Patent Publication (Kokai) No. 2011-167817. In doing so, the learning control unit 42 may use the location of the laser head 16b in the world coordinate system in a case in which the laser head 16b is virtually fixed to the reference point, detected by the location detection unit 41, instead of the location of the distal end of a robot measured by an acceleration sensor or the like in these learning control techniques.

For example, the processor 34 controls the servomotor 35 as described in Japanese Unexamined Patent Publication (Kokai) No. 2006-172149. In other words, the processor 34, in controlling the operation of the robot 2, calculates a speed command for designating the rotation speed of the servomotor 35 based on a location command received from a superordinate control device (not illustrated) or read from the memory 33, the actual rotation amount of the servomotor 35, and the like. The processor 34 performs speed loop control based on the speed command and speed feedback, calculated by differentiating the actual rotation amount of the servomotor 35, to calculate a torque command, which represents the amount of electric current to be supplied to the servomotor 35. The processor 34 then performs loop control on the electric current supplied to the servomotor 35 based on the torque command and electric current feedback from an electric current detector (not illustrated) provided in the drive circuit 32 to drive the servomotor 35.

In this case, the learning control unit 42 learns a correction amount for the rotation amount of the servomotor 35. In other words, the learning control unit 42 calculates a location deviation in each control period, and obtains a latest correction amount by filtering, with a band-limiting filter to stabilize the control system, a value calculated by adding the calculated location deviation to the correction amount in the immediately preceding period. Further, the learning control unit 42 adds a value obtained by compensating, for the correction amount in the immediately preceding period, the phase lag and gain reduction of the control target to the difference between the rotation amount of the servomotor 35 in accordance with the target location designated by the location command and the actual rotation amount of the servomotor 35 and calculates a speed command by multiplying the value obtained as a result of the addition by a position gain.

The learning control unit 42 repeats the above-described processing, for example, until the absolute value of the location deviation is not more than a certain threshold value and stores the correction amount obtained in the memory 33. Note that the certain threshold value may be set, for example, in such a way that the workpiece is machined by the tool 16 to an accuracy within the allowed tolerance.

In the regular operation of the robot 2, the processor 34 may read the correction amount from the memory 33 and, as in the processing by the learning control unit 42 described above, may add a value obtained by compensating, for the read correction amount, the phase lag and gain reduction of the control target to the difference between the rotation amount of the servomotor 35 in accordance with the target location designated by the location command and the actual rotation amount of the servomotor 35 and calculate a speed command by multiplying the value obtained as a result of the addition by a position gain. The processor 34 may perform speed loop control and electric current loop control in accordance with the speed command to drive the servomotor 35.

Figure 4:
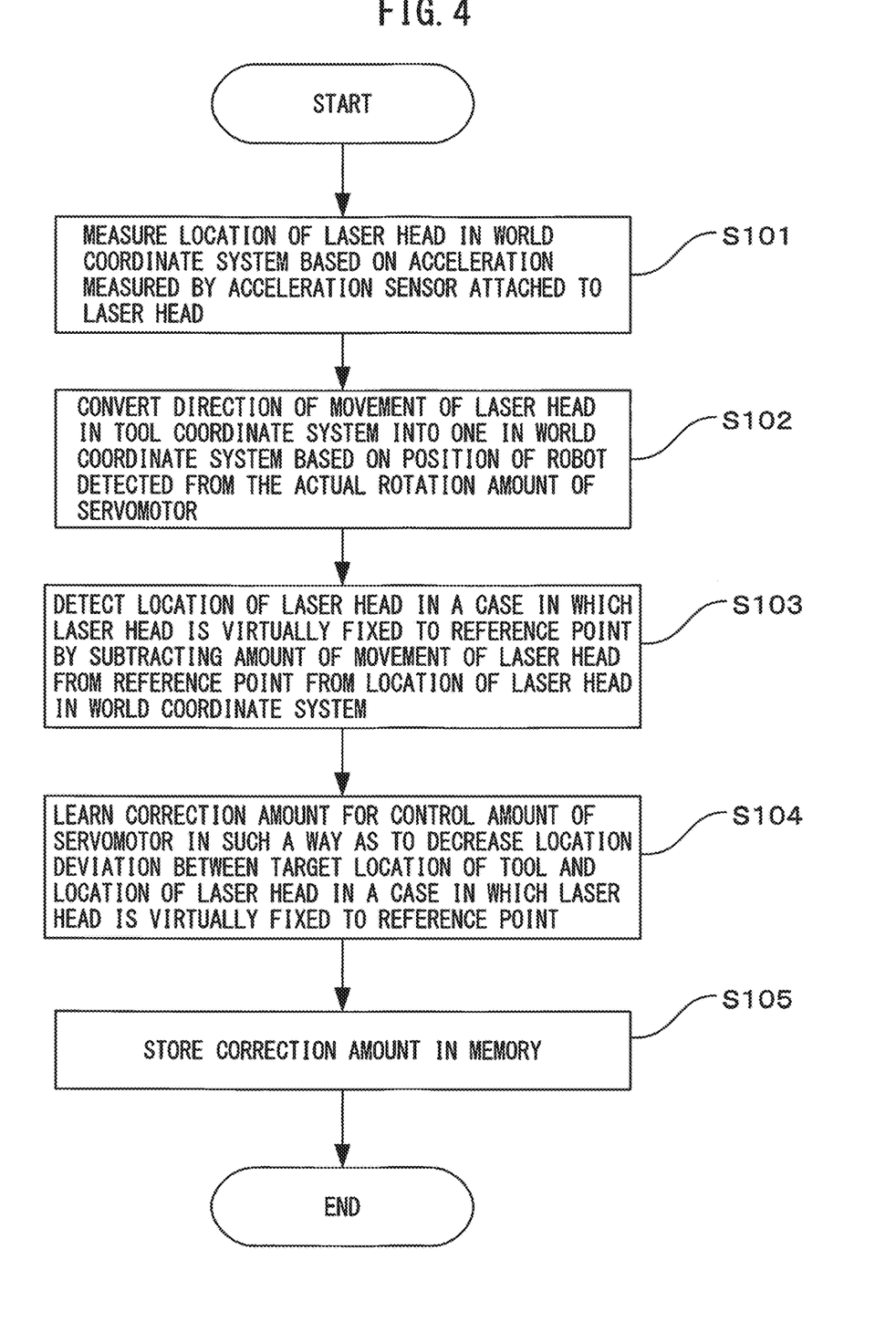
FIG. 4 is an operational flow chart of the control information learning processing.

FIG. 4 is an operational flow chart of the control information learning processing. The processor 34 executes control information learning processing according to the operational flow chart as described below.

The location detection unit 41 measures the location of the laser head 16b in the world coordinate system on the basis of the acceleration measured by the acceleration sensor 4 attached to the laser head 16b when the tool 16 is moved to the target location in accordance with the location command (step S101). Further, the location detection unit 41 converts the direction of movement of the laser head 16b in the tool coordinate system into a direction of movement of the laser head 16b in the world coordinate system according to the position of the robot 2 detected from the actual rotation amount of the servomotor 35 during the period from the start of the operation of the robot 2 to the end of the control for moving the tool 16 to the target location designated by the location command (step S102). The location detection unit 41 then detects the location of the laser head 16b in the world coordinate system in a case in which the laser head 16b is virtually fixed to the reference point by subtracting the amount of movement of the laser head 16b relative to the reference point represented in the world coordinate system from the location of the laser head 16b represented in the world coordinate system (step S103).

The learning control unit 42 learns a correction amount for the control amount of the servomotor 35 in such a way as to decrease the location deviation between the target location of the tool 16 specified by the location command and the location of the laser head 16b in a case in which the laser head 16b is virtually fixed to the reference point, detected by the location detection unit 41 (step S104). The learning control unit 42 stores the obtained correction amount in the memory 33 (step S105). The processor 34 then ends the control information learning processing.

As described above, this automatic machine calculates the location of the movable mechanism which is included by the tool attached to the movable member of the automatic machine, and operates independently of the movable member in a case in which the movable mechanism is virtually fixed to the reference point by subtracting the amount of movement of the movable mechanism relative to the reference point from the location of the movable mechanism calculated based on the measured value from the sensor, which is attached to the movable mechanism. The automatic machine learns a correction amount for the control amount of the drive unit driving the movable member in such a way as to decrease the location deviation between the designated target location of the tool, wherein the target location is identified by the location command, and the location of the movable mechanism in a case in which the movable mechanism is virtually fixed to the reference point. Thus, even when a tool including a movable mechanism that operates independently of the movable member of the automatic machine is attached to the movable member, the automatic machine improves accuracy in location of the movable member and the tool during the operation of the automatic machine.

According to a variation, the processor 34 of the control device 3 may move the tool 16 to a plurality of locations that are different from each other and perform the above-described control information learning processing for each of the locations. In such a case, the processor 34 calculates a correction amount for the control amount of the servomotor 35 with respect to each of the locations and stores the correction amounts with the corresponding locations in the memory 33. In the regular operation of the robot 2, the processor 34 may read from the memory 33 a correction amount that corresponds to the location designated by the location command among the plurality of locations and, by using the read correction amount, correct the control amount of the servomotor 35. Alternatively, the processor 34 may calculate a statistical representative value, such as average, median, or mode, of the correction amounts respectively calculated for the plurality of locations and store the statistical representative value in the memory 33 as a correction amount. In the regular operation of the robot 2, the processor 34 may read the correction amount from the memory 33 irrespective of the location designated by the location command and, by using the read correction amount, correct the control amount of the servomotor 35.

According to this variation, the automatic machine calculates a correction amount for the control amount of the drive unit of the movable member with respect to a plurality of locations different from each other, thereby improving accuracy in location of the movable member and the tool during the operation of the automatic machine.

According to another variation, the movable mechanism included by the tool attached to the movable member of the automatic machine may, instead of being driven actively by a drive unit such as a motor, operate passively by means of elastic member or the like. In such a case also, the acceleration sensor may be attached to the movable mechanism. Further, in such a case, the amount of movement of the movable mechanism from the reference point may be, for example, measured by a sensor, such as a linear encoder, that measures displacement amount of the movable mechanism and be outputted to the control device of the automatic machine.

This allows the control device of the automatic machine to learn a correction amount for the control amount of the drive unit driving the movable member of the automatic machine, by executing the control information learning processing according to the above-described embodiment even when the movable mechanism operates passively.

According to yet another variation, other sensors that can detect displacement amount may be used, instead of or together with the acceleration sensor, for the measuring unit attached to the movable mechanism to measure the location of the movable mechanism included by the tool. Other sensors that can detect displacement amount may be, for example, a gyro sensor, an inertial sensor, a laser tracker, or a stereo camera. When a stereo camera is used, for example, the stereo camera captures images of a marker, which is set in advance and the location of which in the world coordinate system is known, and generates two images depicting the marker. The control device can measure the location of the movable mechanism to which the stereo camera is attached in the world coordinate system by detecting the marker in each of the two images, for example, by template matching, and calculating the location of the stereo camera in the world coordinate system from the locations of the marker on the images by the principle of triangulation.

Note that the sensor attached to the movable mechanism may be detachable from the movable mechanism. The sensor may be detached from the movable mechanism during the regular operation of the automatic machine. When the sensor is detached from the movable mechanism, a balancer having the same weight as the sensor may be attached to the movable mechanism at the attachment position of the sensor.

All examples and specific terms herein are intended for the purpose of teaching that facilitates understanding of the present invention and the concept contributed by the inventor for promoting the technique, and, therefore, should not be construed as being limited to the configuration of any examples, specific examples and conditions for indicating superiority and inferiority of the present invention. It should be understood that, although the embodiments of the present invention have been described in detail, the embodiments can be changed, replaced, or modified without departing from the spirit and scope of the present invention.

What is claimed is:

1. An automatic machine comprising:
   a movable member that is movable by being driven by a motor;
   a tool that is attached to the movable member and includes a movable mechanism that operates independently of the movable member;
   a sensor that is attached to the movable mechanism and configured to measure a location of the movable mechanism; and
   a processor configured to:
      detect, based (1) on a location of the movable mechanism measured by the sensor when the motor is controlled in accordance with a command to move the tool to a target location, the movable mechanism being away from a reference point within a moving range of the movable mechanism with the tool as reference, and (2) on an amount of movement of the movable mechanism from the reference point, a first location assuming when the movable mechanism is at the reference point; and
      calculate a correction amount for a control amount of the motor in such a way as to decrease a difference between the target location and the first location.

2. The automatic machine according to claim 1, wherein the reference point is represented in a tool coordinate system, in which an origin is set at a location on the tool and an axis of the movable member is set (a) in a longitudinal direction of the tool or (b) in a direction in which the movable mechanism of the tool is movable.

3. An automatic machine, comprising:
   a movable member that is movable by being driven by a motor;
   a tool that is attached to the movable member and includes a movable mechanism that operates independently of the movable member;
   a sensor that is attached to the movable mechanism and configured to measure a location of the movable mechanism; and
   a processor configured to:
      detect, based (1) on a location of the movable mechanism measured by the sensor when the motor is controlled in accordance with a command to move the tool to a target location, the movable mechanism being away from a reference point within a moving range of the movable mechanism with the tool as reference, and (2) on an amount of movement of the movable mechanism from the reference point, a first location assuming when the movable mechanism is at the reference point; and calculate a correction amount for a control amount of the motor in such a way as to decrease a difference between the target location and the first location, wherein the processor is further configured to detect the first location by calculating a position of the movable member, based on an operation amount of the motor when the motor is controlled in accordance with the command, by calculating, according to the position, a direction of movement of the movable mechanism in a world coordinate system that is set with respect to a space in which the automatic machine is installed, and by subtracting the amount of movement from the location of the movable mechanism measured by the sensor along the direction of movement.

4. The automatic machine according to claim 3, wherein the reference point is represented in a tool coordinate system, in which an origin is set at a location on the tool and an axis of the movable member is set (a) in a longitudinal direction of the tool or (b) in a direction in which the movable mechanism of the tool is movable.

5. A control device of an automatic machine that comprises a movable member that is movable by being driven by a motor, and a tool that is attached to the movable member and includes a movable mechanism that operates independently of the movable member, the control device comprising:

a processor configured to:
detect, based (1) on a location of the movable mechanism measured by a sensor attached to the movable member when the motor is controlled in accordance with a command to move the tool to a target location, the movable mechanism being away from a reference point within a moving range of the movable mechanism with the tool as reference, and (2) on an amount of movement of the movable mechanism from the reference point, a first location assuming when the movable mechanism is at the reference point; and calculate a correction amount for a control amount of the motor in such a way as to decrease a difference between the target location and the first location.

6. The control device according to claim 5, wherein the reference point is represented in a tool coordinate system, in which an origin is set at a location on the tool and an axis of the movable member is set (a) in a longitudinal direction of the tool or (b) in a direction in which the movable mechanism of the tool is movable.

* * * * *